United States Patent [19]

Hale

[11] Patent Number: 5,138,584
[45] Date of Patent: Aug. 11, 1992

[54] MIGRATION OF SEISMIC TURNING WAVES

[75] Inventor: Ira D. Hale, Golden, Colo.

[73] Assignee: Chevron Research & Technology Company, San Francisco, Calif.

[21] Appl. No.: 616,688

[22] Filed: Nov. 21, 1990

Related U.S. Application Data

[63] Continuation of Ser. No. 401,911, Sep. 6, 1989, abandoned.

[51] Int. Cl.$^5$ .............................................. G01V 1/36
[52] U.S. Cl. ...................................... 367/53; 367/50; 364/421
[58] Field of Search ................... 364/421; 367/48, 50, 367/51, 53, 55, 63, 36

[56] References Cited

U.S. PATENT DOCUMENTS

| | | | |
|---|---|---|---|
| H482 | 6/1988 | Berryhill et al. | 367/38 |
| 4,355,379 | 10/1982 | Sherwood | 367/68 |
| 4,464,737 | 8/1984 | Pann | 367/49 |
| 4,745,585 | 5/1988 | Larner | 367/50 |
| 4,766,574 | 8/1988 | Whitmore, Jr. et al. | 367/50 |
| 4,797,861 | 1/1989 | Beasley | 367/50 |
| 4,878,204 | 10/1989 | Black et al. | 367/53 |
| 4,878,205 | 10/1989 | Gelchinsky | 367/61 |
| 4,888,742 | 12/1989 | Beasley | 367/53 |

OTHER PUBLICATIONS

Yilmaz, O., "Migration" in Seismic Data Processing, pp. 241-278, SEG, Tulsa 1987.
Aki and Richards, *Quantitative Seismology—Theory and Methods* (Freeman & Co., 1980), pp. 416-417.
Claerbout, "Imaging the Earth's Interior" (Blackwell Scientific Publications, 1985), pp. 272-273.
Gazdag, J., "Wave Equation Migration with the Phase-shift Method", *Geophysics*, vol. 43, No. 7 (Dec. 1978), pp. 1342-1351.
Whitmore, N. D., "Iterative Depth Migration by Backward Time Propagation," 1983, 53rd Annual Intnl. Mtg., Soc. Explor. Geophysics, Expanded Abstracts, pp. 382-385.
Baysal, E. et al., "A Two-way Non-reflecting Wave Equation," *Geophysics*, vol. 49, No. 2 (Feb. 1984), pp. 132-141.
Loewenthal, D. et al., "Short Note: Suppressing the Unwanted Reflections of the Full Wave Equation," *Geophysics*, vol. 52, No. 7 (Jul. 1987), pp. 1007-1012.
Louie, J. N. et al. "Three-dimensional Imaging of Steeply Dipping Structure Near the San Andreas Fault, Parkfield, Calif.," *Geophysics*, vol. 53, No. 2 (Feb. 1988), pp. 176-185.
B. T. May and J. D. Covey, *Geophysics*, vol. 48, No. 8 (Aug. 1983); pp. 1039-1050 "Structural Inversion of Salt Dome Flanks".
Zhiming Li, Stanford University, Dissertation, Jun. 1986; pp. 7-15; "Imaging Steep-Dip Reflections by the Linearly Transformed Wave Equation Method".

*Primary Examiner*—Ian J. Lobo
*Attorney, Agent, or Firm*—Burns, Doane Swecker & Mathis

[57] ABSTRACT

A method for migrating seismic data for formations that are located in geological media that cause seismic waves to be refracted so substantially that the waves turn upward. The method includes the steps of tabulating a first phase shift function as a function of the wave vector and the angular frequency of seismic waves in the geological media, tabulating a second phase shift function, storing the tabulated values of the first and second phase shift functions, calculating a third phase shift function based upon the first and second phase shift functions; and migrating recorded seismic data using the first, second and third phase shift functions.

13 Claims, 1 Drawing Sheet

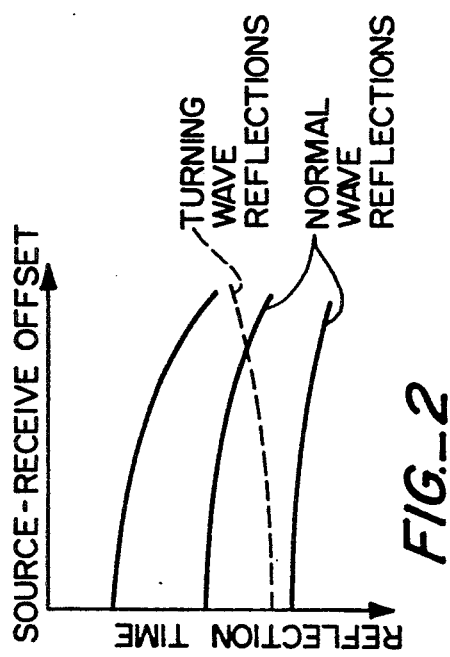
FIG._1
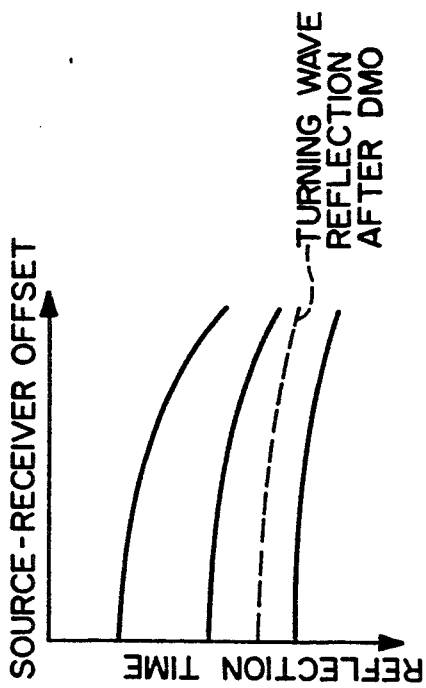
FIG._2
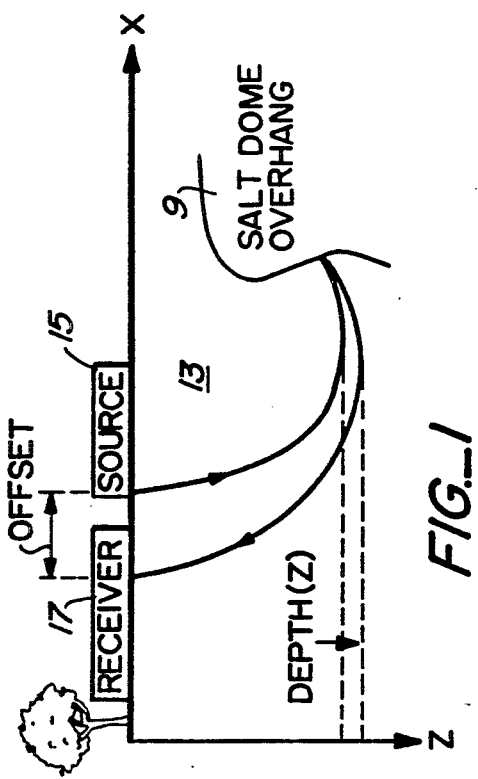
FIG._4
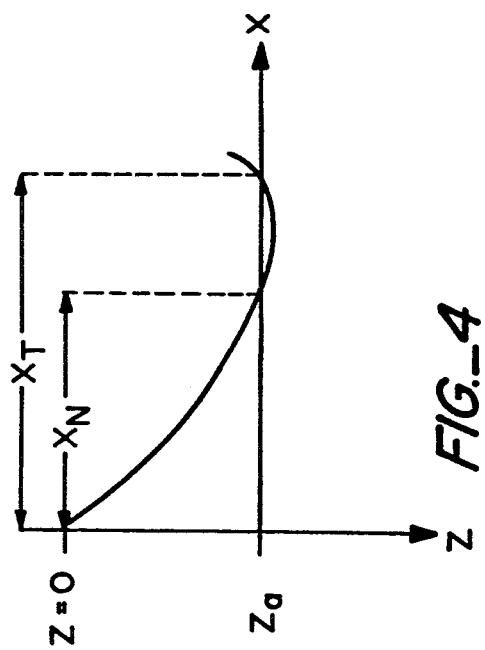
FIG._3

MIGRATION OF SEISMIC TURNING WAVES

This application is a continuation of application Ser. No. 07/401,911, filed Sep. 6, 1989, now abandoned.

BACKGROUND OF THE INVENTION

1. Field of the Invention

The present invention generally relates to reflection seismology and, more particularly, to the migration of seismic data to provide images of subsurface formations that are located in geological media that cause seismic waves to be refracted so substantially that the waves turn upward.

2. State of the Art

One of the primary goals of reflection seismology is to obtain images of subsurface geological formations based upon information gleaned from surface recording of reflections of seismic waves that are purposefully directed into the earth. Toward that end, it is well known that seismic waves recorded at the earth's surface by geophones or hydrophones can be displayed in two- or three-dimensional seismic "time sections", each consisting of a large number of seismic traces.

Although visual inspection of seismic time sections can intuitively suggest the shape and location of subsurface reflecting formations, the visually-apparent images may be misleading as to the actual shape and location of the reflectors. For example, various geological conditions may cause signals reflected from a shallow formation to be received later than signals reflected from a deeper formation; where such conditions exist, visual consideration of time sections can lead to erroneous conclusions as to the positions of formations with respect to depth. Accordingly, it is ordinarily necessary to manipulate, or "migrate", recorded seismic data for the purpose of producing two- or three-dimensional images, called migrated sections, that depict the proper spatial locations of subsurface reflecting formations.

Migration processes for seismic data are usually computationally intensive One reason for the computational intensity is that seismic surveys, even small-scale ones, yield vast quantities of data. Thus, to avoid excessive data processing time and expense, migration algorithms should be efficient.

In practice, migration algorithms are based upon assumptions (i.e., models) concerning the geology that is being imaged. When actual geological conditions substantially deviate from expected subsurface conditions, a particular migration program may be ineffective or may produce misleading results. For example, a migration program that assumes a model of constant wave velocity throughout stratified formations may inaccurately depict the locations of subsurface formations where geological conditions cause wave velocities to increase rapidly with depth.

In the art of reflection seismology, seismic waves that substantially change direction with depth are called turning waves. Generally speaking, geological media that produce turning waves have the characteristic that the velocity of seismic waves increases with depth in the media. In some circumstances, directional changes are so substantial that wave fronts that were initially directed downward become horizontally directed, or even upwardly directed. During seismic surveys in such media, seismic waves may turn as they travel downward from a source, or as they travel upward from a reflector, or in both directions of travel.

Heretofore, there have not existed computationally efficient migration algorithms for imaging subsurface reflectors that reside in geological media that cause seismic waves to be refracted so substantially that the waves turn upward.

SUMMARY OF THE INVENTION

The present invention provides an efficient and effective method for migrating seismic data to provide images of subsurface formations that are located in geological media that cause seismic waves to be refracted so substantially that the waves turn upward. In one of the preferred embodiments of the invention, the method of the present invention includes the steps of:

tabulating a first phase shift function $t^*(p)$ as a function of selected values of the variable p, where p is a wave parameter that equals the ratio of $|\underline{k}|$ to $\omega$, where $\underline{k}$ is the wave vector and $\omega$ is the angular frequency of compressional waves in geological media wherein seismic wave velocity, v, increases substantially with depth;

storing the tabulated values of the first phase shift function in the memory of a general purpose digital computer;

tabulating a second phase shift function $\tau_N(p,z)$ as a function of the selected values of the wave parameter, p, and the depth of travel, z, of non-turning waves in the geological media under consideration;

storing the tabulated values of the second phase shift function in the memory of a general purpose digital computer;

calculating a third phase shift function $\tau_T(p,z)$ for seismic waves which turn upward in the geological media by the following equation:

$$\tau_T(p,z) = 2\tau^*(p) - \tau_N(p,z); \text{ and}$$

migrating recorded seismic data relating to subsurface formations in the geological media using the first, second and third phase shift functions.

Based upon tabulations of values as described above, a wave field can be extrapolated substantially as follows:

$$P(\omega,\underline{k};z) = P(\omega,\underline{k};z=0)\, B_M\left(\frac{|\underline{k}|}{\omega},z\right)\left\{ e^{-\omega\tau(\frac{\underline{k}}{\omega},z)} + e^{i\omega\tau(\frac{\underline{k}}{\omega},z)-2i\omega\tau^*(\frac{\underline{k}}{\omega})+\frac{i\pi}{2}} \right\}$$

where:

$$B_M\left(\frac{\underline{k}}{\omega},z\right) = \left\{ \frac{\frac{1}{v^2(0)} - \frac{|\underline{k}|^2}{4\omega^2}}{\frac{1}{v^2(z)} - \frac{|\underline{k}|^2}{4\omega^2}} \right\}^{\frac{1}{4}}$$

where values of the function $P(\omega,k;z=0)$ represent the Fourier transform of common midpoint stacked seismograms.

Alternatively, a wave field can be extrapolated using the tabulated values in the following function:

$$P(\omega,\underline{k};z) = P(\omega,\underline{k};z=0) \cdot$$

-continued $$\left\{ \begin{array}{l} B_N\left(\frac{k}{\omega};z\right)e^{-i\omega\tau(\frac{k}{\omega};z)} + \\ B_T\left(\frac{k}{\omega};z\right)e^{+i\omega\tau(\frac{k}{\omega};z)-2i\omega\tau^*(\frac{k}{\omega})+i\frac{\pi}{2}} \end{array} \right\}$$

with values for the functions $B_N$ and $B_T$ being determined as follows:

$$B_N(k,z,\omega) = \frac{2s^2(z)\,[s^2(0) - p^2]^{\frac{1}{2}}}{-i\omega\pi^2} \left| \frac{x_N dx_N}{pdp} \right|^{\frac{1}{2}}$$

$$B_T(k,z,\omega) = \frac{2s^2(z)\,[s^2(0) - p^2]^{\frac{1}{2}}}{-i\omega\pi^2} \left| \frac{x_T dx_T}{pdp} \right|^{\frac{1}{2}}$$

where the functions $\tau$ and $\tau^*$ represent phase delays defined by the ray parameter $p = |k|/\omega$ at depths z and $z^*$, respectively, where $z^*$ is the turning point depth, and where the amplitudes of $B_N$ and $B_T$ depend on the ratio of $|k|/\omega$.

In another of the preferred embodiments of the present invention, the following function is transformed into the frequency domain, $$E(k,z) = \int d\omega f(k,\omega) \begin{pmatrix} B_N(k,z,\omega)e^{-2i\omega\tau N(k,z,\omega)} + \\ B_T(k,z,\omega)e^{i\frac{\pi}{2} - 2i\omega\tau T(k,z,\omega)} \end{pmatrix}$$

with the functions $B_N$ and $B_T$ are related to the amplitudes of the wavefield normal and turned components, respectively, and where the variable $k$ is the seismic wave vector, z is depth in the geological medium, $\omega$ is the angular frequency of the wave traces, and the variables $\tau_N$ and $\tau_T$ represent phase delays of normal and turning waves, respectively;

then, the transformed data is migrated for turning and non-turning waves according to the following migration algorithm:

```
Initialize E(k,z) = 0.
For all wave vectors k
    [
    For all frequencies ω
        [
        Compute p = |k|/ω to
        index tabulated phase-delays τ_n and
        τ_T and amplitudes B_N and B_T
        for all depths z
            [
            P(ω,k;z) = extrapolation
            of P(ω,k;z=0), and
            E(k,z) = E(k,z) +
            P(ω,k;z)
            ]
        ]
    ]
``` after values of the function E(k,z) are calculated in accordance with the preceding algorithm, the inverse transform is calculated to represent the migrated image of a subsurface formation located in geological media that causes seismic waves to turn.

The functions $B_N$ and $B_T$ in the equation for $e(k,z)$ can, for example, be calculated based upon the following equations:

$$B_N(k,z,\omega) = \frac{2s^2(z)\,[s^2(0) - p^2]^{\frac{1}{2}}}{-i\omega\pi^2} \left| \frac{x_N dx_N}{pdp} \right|^{\frac{1}{2}}$$

$$B_T(k,z,\omega) = \frac{2s^2(z)\,[s^2(0) - p^2]^{\frac{1}{2}}}{-i\omega\pi^2} \left| \frac{x_T dx_T}{pdp} \right|^{\frac{1}{2}}$$

where the variable "s" is the inverse of wave velocity, the variable "p" is the ray parameter and is equal to $|k|/\omega$; and the variables $x_N$ and $x_T$ are functions of the ray parameter p and depth z, and represent the horizontal travel distances of the normal and turning waves, respectively.

BRIEF DESCRIPTION OF THE DRAWINGS

The present invention can be further understood by reference to the following description and appended drawings. In the drawings:

FIG. 1 is a diagram that schematically shows a seismic turning wave of the type operated upon by the migration process of the present invention;

FIG. 2 is a graph depicting the relationships between source-receiver offset and reflection times for normal and turning waves;

FIG. 3 is a graph showing reflection times for turning and non-turning waves after conventional dip-moveout (DMO) processing; and FIG. 4 is a schematic diagram of the path of travel of a typical seismic turning wave.

DETAILED DESCRIPTION OF THE PREFERRED EMBODIMENT

FIG. 1 generally shows a salt dome 9 residing in a geological medium 13 which refracts seismic waves in a manner such that the waves continuously turn as they travel downward from a seismic source 15 located at the earth's surface. According to the conditions depicted in FIG. 1, seismic waves also turn during their return trip to a receiver 17 at the earth's surface. In view of the preceding discussion, it can be appreciated that geological medium 13 has the characteristic that wave velocity increases with depth.

Further with regard to FIG. 1, it should be noted that salt dome 9 includes an overhanging surface. Such overhanging surfaces are not reached by non-turning rays whose paths are entirely within the surrounding geological medium 13. Accordingly, seismic migration of non-turning waves ordinarily cannot completely image overhanging subsurface structures.

In seismic surveys that record both turning waves and non-turning waves, reflections from the turning waves may be received later than reflections from the non-turning waves even though some of reflectors encountered by the turning waves may be closer to the earth's surface than reflectors encountered by the non-turning waves. Thus, to detect turning waves in seismic surveys, it may be necessary to increase recording times. Further to detect turning waves, it may be necessary to locate seismic sources and recorders farther than normal from subsurface reflectors.

As shown in FIG. 2, turning waves are characterized by reflection times that decrease with source-receiver offset. By way of contrast, reflection times for non-turning waves typically increase with source-receiver offset. This distinctive characteristic of turning waves often allows them to be recognized without substantial computations. For instance, it is often possible to recognize turning waves by scrutinizing recorded reflection times in common-midpoint (CMP) gathers of seismograms.

For present purposes, a CMP gather can be defined as a collection of seismograms for which the source-receiver midpoint is the same or "common." Seismograms in a CMP gather are typically averaged or "stacked" over offset to enhance reflections. In practice, the stacking process is preceded by processing wherein wave information recorded with offset sources and receivers is adjusted such that the stacked information appears to have been originated and recorded at the source-receiver midpoint.

When it is desired to migrate seismograms of turning waves, steps must be taken to preserve the uniqueness of the turning wave information. In practice, such information is most conveniently preserved by initially processing seismograms with a dip-moveout (DMO) algorithm. The effect of a DMO algorithm is to alter the recorded times of turning waves to appear substantially like the recorded times of normal waves in terms of variation with source-receiver offset.

FIG. 3 illustrates the result of typical DMO processing of the waves of FIG. 2. That is, the drawing provides a plot of reflection times versus source-receiver offset for both turning and non-turning waves after DMO processing. It should be noted that information that is unique to turning waves will be lost if the waves are averaged over offset without DMO processing.

Before or after DMO processing of recorded seismic data containing turning wave information, it is preferred that the data are subjected to correction by conventional normal-moveout (NMO) algorithms. The corrected data then are enhanced by CMP stacking. After NMO processing and CMP stacking, seismic information that contains turning wave data can be migrated so that the wave traces in seismic time sections are moved to their proper places in seismic depth sections.

According to the methodology of the present invention, migration of turning waves is premised upon obtaining both down-going and up-going solutions to the acoustic wave equation:

$$\nabla^2 f - \frac{1}{v^2(z)} \frac{d^2 f}{dt^2} = 0. \tag{1}$$

According to the preceding equation, the pressure of waves recorded at the earth's surface during a seismic survey is described by the function $f=f(t,x;z=0)$. In the function, the independent variable t represents recording time, the independent variable x represents horizontal position of the stacked trace, and the independent variable z represents depth below the seismic source at the earth's surface.

FIG. 4 depicts the horizontal distance, x, and depth, z, that a seismic turning wave travels as it is refracted through the earth while moving away from its source at depth $z=0$. In the drawing, $z_a$ indicates an arbitrary depth above the turning point. It should be noted that the wave reaches depth $z_a$ twice, once while travelling downward and once while travelling upward following the turning point.

In FIG. 4, the symbol $X_n$ designates the horizontal distance that the turning wave travels to reach depth $z_a$ on its downward path from the earth's surface. The symbol $X_T$ designates the horizontal distance that the wave has traveled by the time it reaches depth $z_a$ after turning toward the earth's surface.

As is well known, migration of seismic data can be facilitated by transforming time-domain wave traces to the frequency domain. Typically, the transformations are done by using Fast Fourier Transform algorithms. The Fourier-transformed information is equivalent to the original time-domain information except that wave traces are characterized by the amplitudes and phases of their frequency components. The three-dimensional Fourier transform of the preceding acoustic wave equation is as follows:

$$\frac{d^2 f}{dz^2} + \left[ \frac{\omega^2}{v^2(z)} - k_x^2 - k_y^2 \right] f = 0. \tag{2}$$

In the Fourier-transformed equation, the independent variable $\omega$ represents the angular frequency of the wave traces; and the independent variables $k_x$ and $k_y$ are the scalar components of the wave vector $\underline{k}$; that is, $\underline{k} = k_x \underline{x} + k_y \underline{y}$. The scalar variables $k_x$ and $k_y$ are often referred to as wave numbers. In physical terms, wave numbers are inversely related to the wave length, $\lambda$, of a wave; or, more particularly, $$|\underline{k}| = \sqrt{k_x^2 + k_y^2} = 2\pi/\lambda.$$

Thus, the scalar variables $k_x$ and $k_y$ can be understood to be the Fourier-transform duals of distances in the x- and y-directions, respectively.

Fourier-transformed equation (2) can be manipulated by analytical techniques to express the perturbation, e, of a reference velocity function v(z) given the reflected zero-offset wavefield $f(k,\omega)$. In particular, the equation can be manipulated to yield the following equation for the perturbation function:

$$e(\underline{k},z) = \int d\omega f(\underline{k},\omega) \begin{pmatrix} B_N(\underline{k},z,\omega) e^{-2i\omega\tau N(\underline{k},z,\omega)} + \\ B_T(\underline{k},z,\omega) e^{i\frac{\pi}{2} - 2i\omega\tau T(\underline{k},z,\omega)} \end{pmatrix} \tag{3}$$

In equation (3), the independent variables $\underline{k}$, z and $\omega$ are as previously defined. The variables $\tau_N$ and $\tau_T$ represent phase delays of the normal and turning waves, respectively. It should be noted that the equation indicates that the turning waves are phase shifted by $\pi/2$ radians.

The functions $B_N$ and $B_T$ in the perturbation equation are related to the amplitudes of the wavefield normal and turned components, respectively. Although the functions $B_N$ and $B_T$ can be expressed in various ways, it is convenient to express them as follows:

$$B_N(\underline{k},z,\omega) = \frac{2s^2(z)\,[s^2(0) - p^2]^{\frac{1}{2}}}{-i\omega\pi^2} \left| \frac{x_N dx_N}{p dp} \right|^{\frac{1}{2}} \tag{4}$$

-continued $$B_T(\underline{k},z,\omega) = \frac{2s^2(z) [s^2(0) - p^2]^{\frac{1}{2}}}{-i\omega\pi^2} \left| \frac{x_T dx_T}{p dp} \right|^{\frac{1}{2}} \quad (5)$$

The independent variable "s" in the preceding equations is the inverse of wave velocity and, therefore, represents the "slowness" of seismic waves. The variable "p" in the equations is the ray parameter and is equal to the ratio of $|\underline{k}|$ to $\omega$; i.e., $p=|\underline{k}/\omega|$. The variables $x_N$ and $x_T$ are functions of the ray parameter p and depth z. Those two variables represent the x-direction travel distances of the normal and turning waves, respectively, as shown, for example, in FIG. 4.

With the functions $B_N$ and $B_T$ as defined by equations (4) and (5), migration of Fourier-transformed data for turning and non-turning waves can be accomplished by the following migration algorithm.

---

Initialize $E(\underline{k},z) = 0$.
For all wave vectors $\underline{k}$
[
    For all frequencies $\omega$
    [
        Compute $p = |\underline{k}|/\omega$ to
        index tabulated phase-delays $\tau_n$ and
        $\tau_T$ and amplitudes $B_N$ and $B_T$
        for all depths z
        [
            $P(\omega,\underline{k};z)$ = extrapolation
            of $P(\omega,\underline{k};z=0)$, and
            $E(\underline{k},z) = E(\underline{k},z) +$
            $P(\omega,\underline{k};z)$
        ]
    ]
]

---

In the preceding algorithm, it is preferred to accomplish the extrapolation for each depth independently by the following equation:

$$P(\omega,\underline{k};z) = P(\omega,\underline{k};z=0) \cdot \quad (6)$$

$$\left\{ \begin{array}{l} B_N\left(\frac{\underline{k}}{\omega};z\right)e^{-i\omega\tau(\frac{\underline{k}}{\omega};z)} + \\ B_T\left(\frac{\underline{k}}{\omega};z\right)e^{+i\omega\tau(\frac{\underline{k}}{\omega};z)-2i\omega\tau^*(\frac{\underline{k}}{\omega})+i\frac{\pi}{2}} \end{array} \right\}$$

After values of the function $E(k,z)$ are calculated in accordance with the preceding algorithm, inverse Fourier transforms are calculated. The values of the inverse transforms represent the migrated image of a subsurface formation located in geological media that causes seismic waves to turn.

In equation (6), the functions $\tau$ and $\tau^*$ represent phase delays defined by the ray parameter $p=|\underline{k}|/\omega$ at depths z and $z^*$, respectively, where $z^*$ is the turning point depth. Further in the equation, it should be noted that the amplitudes of $B_N$ and $B_T$ do not depend on k and $\omega$ individually but, rather, on the ratio of $|\underline{k}/\omega|$. That is, the amplitudes of $B_N$ and $B_T$ depend upon the ray parameter.

Further as to equation (6), it should be noted that the exponential factor $$\exp\left(\frac{i\pi}{2}\right)$$

provides a ninety degree phase shift for the turning waves. This phase shift is unique to the migration of turning waves, and is due to the fact that plane waves passing through a turning point experience a ninety degree phase shift.

In practice, values of $B_N$, $B_T$ and $\tau_N$ are tabulated as functions of depth, z, and the wave parameter, p. Typically about one-hundred values of the wave parameter and about one-thousand depth values are employed in the tabulations, resulting in about one-hundred thousand entries each for $B_N$, $B_T$ and $\tau_N$. To provide the tabulated entries, it is convenient to, first, tabulate values for $B_N$ and $\tau_N$ for selected values of the wave parameter p and depths z. The minimum value of the wave parameter is usually chosen to equal zero, and the maximum value is usually chosen to equal the value beyond which waves are evanescent at the earth's surface.

Further in the tabulation, values for $\tau^*$ (i.e., the phase delays at the turning point) are computed for selected values of the wave parameter, p. Then, values of the function $\tau(p,z)$ are found from the following equation:

$$\tau_T(p,z)=2\tau^*(p)-\tau_N(p,z).$$

After values for $\tau^*$ and $\tau(p,z)$ have been tabulated, values of $B_N$, and $\tau_T$ are tabulated for the selected values of the ratio $|\underline{k}|/\omega$. The tabulated values are then stored in computer memory. As a result of compiling the tabulated values, the extrapolated wavefield $P(\omega,\underline{k},z)$ can be computed at any depth z in one step. That is, the extrapolated wavefield $P(\omega,\underline{k},z)$ can be computed without iteration.

In practice, tabulation of the phase shift function results in substantial computational efficiencies when executing the above-described migration algorithm. In conventional migration programs, by way of contrast, phase shift functions are computed iteratively with depth. Thus, conventional computation of phase shifts for waves at a given depth, z, normally requires computation of phase shifts at a lesser depth, which requires computation of the phase shifts at a still lesser depth, and so forth until the computation depth equals zero (i.e., surface elevation). Such conventional computations are substantially less efficient than those described above.

Although the present invention has been illustrated and described in accordance with a preferred embodiment, it should be recognized that variations and changes may be made therein without departing from the invention as set forth in the following claims. Workers skilled in the art will recognize, for instance, that expressions of the function $P(\omega,\underline{k};z)$ other than equation (6) can be employed in the above-discussed migration algorithm.

For example, in one alternative implementation of the above-described seismic migration process, the Fourier-transformed wavefield $P(\omega,\underline{k};z=0)$ can be extrapolated (i.e., phase-shifted and scaled) in depth z for each selected wavenumber $\underline{k}$ and each selected frequency $\omega$, by (employing slightly different assumptions) as follows:

$$P(\omega,\underline{k};z) =$$

-continued $$P(\omega,\underline{k};z = 0) B_M\left(\frac{|k|}{\omega},z\right) \left\{ \begin{array}{l} e^{-\omega\tau(\frac{k}{\omega},z)} + \\ e^{i\omega\tau(\frac{k}{\omega},z)-2i\omega\tau^*(\frac{k}{\omega})+\frac{i\pi}{2}} \end{array} \right.$$

In the preceding equation, $$B_M\left(\frac{k}{\omega},z\right) = \left\{ \frac{\frac{1}{r^2(0)} - \frac{|k|^2}{4\omega^2}}{\frac{1}{r^2(z)} - \frac{|k|^2}{4\omega^2}} \right\}^{\frac{1}{4}}$$

where values of the function $P(\omega, \underline{k};z=0)$ represent the magnitude of the Fourier transform of CMP stacked seismograms.

If more information regarding the characteristics of the subsurface reflecting strata is desired, the functions $B_N$ and $B_T$ can be tabulated as described above and substituted for the function $B_M$ in accordance with equation (6).

Accordingly, the above-described embodiments should be regarded as illustrative rather than restrictive, and it should be appreciated that workers skilled in the art may make variations in those embodiments without departing from the spirit or scope of the present invention as defined by the following claims.

What is claimed is:

1. A method of seismic imaging overhanging subsurface structures comprising the steps of:
   a) initiating a seismic source to generate seismic waves in a geologic medium which refracts seismic waves such that the waves, which initially travel downward from the seismic source, turn to permit the seismic waves to contact and be reflected from surfaces beneath overhanging subsurface structures which reflect the refracted waves such that the reflected waves turn as the reflected seismic waves travel through the geologic medium;
   b) positioning a plurality of offset receivers to receive and record the reflected waves at locations offset from the overhanging subsurface structure to form a collection of time-amplitude traces of a seismogram;
   c) processing the traces by dip-moveout processing to alter the recorded times of amplitude variations of the reflected waves to form a seismogram that appears substantially like the recorded amplitude-time traces of a seismogram of unturned wave reflections for offset positions of the source and receivers;
   d) stacking the traces to form a multiplicity of common mid-point gathers; and
   e) migrating the common mid-point gathers with turning wave migration processing to display images of reflected seismic waves from beneath an overhanging subsurface structure at their correct depth and location relative to the source and receiver positions above the geological medium.

2. A method in accordance with claim 1 wherein step (c) is preceded by correcting the traces for normal moveout removal.

3. A method in accordance with claim 1 wherein step (c) is followed by correcting the altered amplitude-time traces for normal moveout removal.

4. A process for migrating seismic data relating to subsurface formations located in geological media which cause initially downwardly travelling seismic waves to turn upward, comprising the steps of:
   tabulating a first phase shift function $\tau^*(p)$ as a function of selected values of the variable p, where p is a wave parameter that equals the ratio of $|\underline{k}|$ to $\omega$, where $\underline{k}$ is the wave vector and $\omega$ is the angular frequency of seismic waves in geological media wherein seismic wave velocity, v, increases substantially with depth;
   storing the tabulated values of the first phase shift function in the memory of a general purpose digital computer;
   tabulating a second phase shift function $\tau_N(p,z)$ as a function of the selected values of the wave parameter, p, and the depth of travel, z, of non-turning waves in the geological media under consideration;
   storing the tabulated values of the second phase shift function in the memory of a general purpose digital computer; according to the following equation in which relates a third phase shift function to the first and second phase shift functions, calculating the value of the third phase shift function $\tau_T(p,z)$ for seismic waves which turn upward in the geological media:

$$\tau_T(p,z) = 2\tau^*(p) - \tau_N(p,z); \text{ and}$$

migrating recorded seismic data relating to subsurface formations in the geological media using the first, second and third phase shift functions.

5. A process according to claim 4 wherein, based upon the tabulated values of the first and second phase shift functions, a wave field is extrapolated substantially as follows:

$$P(\omega,\underline{k};z) = P(\omega,\underline{k};z = 0) B_M\left(\frac{|k|}{\omega},z\right)\{e^{-\omega\tau_N(\frac{k}{\omega},z)} + e^{i\omega\tau_N(\frac{k}{\omega},z)-2i\omega\tau^*(\frac{k}{\omega})+\frac{i\pi}{2}}\}$$

where:

$$B_M\left(\frac{k}{\omega},z\right) = \left\{ \frac{\frac{1}{r^2(0)} - \frac{|k|^2}{4\omega^2}}{\frac{1}{r^2(z)} - \frac{|k|^2}{4\omega^2}} \right\}^{\frac{1}{4}}$$

where values of the function $P(\omega,\underline{k};z=0)$ represent the Fourier transform of common midpoint stacked seismograms.

6. A process according to claim 4 wherein, based upon the tabulated values of the first and second phase shift functions, a wave field is extrapolated substantially as follows:

$$P(\omega,\underline{k};z) =$$

-continued $$P(\omega,\underline{k};z=0) \begin{Bmatrix} B_N\left(\frac{\underline{k}}{\omega};z\right)e^{-i\omega\tau_n(\frac{\underline{k}}{\omega};z)} + \\ B_T\left(\frac{\underline{k}}{\omega};z\right)e^{+i\omega\tau_n(\frac{\underline{k}}{\omega};z)-2i\omega\tau^*(\frac{\underline{k}}{\omega})+i\frac{\pi}{2}} \end{Bmatrix}$$

with values for the amplitude functions $B_N$ and $B_T$ being determined as follows:

$$B_N(\underline{k},z,\omega) = \frac{2s^2(z)[s^2(0)-p^2]^{\frac{1}{2}}}{-i\omega\pi^2} \left|\frac{x_N\,dx_N}{p\,dp}\right|^{\frac{1}{2}}$$

and, $$B_T(\underline{k},z,\omega) = \frac{2s^2(z)[s^2(0)-p^2]^{\frac{1}{2}}}{-i\omega\pi^2} \left|\frac{x_T\,dx_T}{p\,dp}\right|^{\frac{1}{2}}$$

where the functions $\tau$ and $\tau^*$ represent phase delays defined by the ray parameter $p=|\underline{k}|/\omega$ at depths z and $z^*$, respectively, where $z^*$ is the turning point depth, where the amplitudes of $B_N$ and $B_T$ depend on the ratio of $|\underline{k}|/\omega$, and where the variables $x_N$, $x_T$, which are functions of the ray parameter p and depth z, represent the x-direction travel distances of the normal and turning waves, respectively.

7. A process for migrating seismic data relating to subsurface formations located in geological media which cause seismic waves to turn upward, comprising the steps of:

phase-shifting and scaling a Fourier-transformed zero-offset stacked time-section $P(\omega,\underline{k};z=0)$ according to functions that depend only upon the ratio of $|\underline{k}|$ to $\omega$ at each depth z, where $|\underline{k}|$ is the wave vector and $\omega$ is the angular frequency of seismic waves in a medium wherein seismic wave velocity, v, increases with depth;

tabulating values for the functions for a number of values of the ratio of $|\underline{k}|$ to $\omega$, and storing the tabulated values in the memory of a general purpose digital computer;

operating the computer to execute the following algorithm:

---

Initialize $E(\underline{k},z) = 0$.
For all wave vectors $\underline{k}$
[
  For all frequencies $\omega$
  [
    Compute $p = |\underline{k}|/\omega$ to
  index tabulated phase-delays $\tau_n$ and
$\tau^*$ and amplitude functions
    for all depths z
    [
      $P(\omega,\underline{k};z) = $ extrapolation
of $P(\omega,\underline{k};z=0)$, and
      $E(\underline{k},z) = E(\underline{k},z) + $
$P(\omega,\underline{k};z)$
    ]
  ]
]

--- where the function $P(\omega,\underline{k};z)$ represents an extrapolated wavefield;

where $\tau_n$ is a phase delay function that depends upon values of wave parameter, p, and the depth of travel, z, of waves in the geological media under consideration;

where $\tau^*(p)$ is a phase delay function that depends upon values of the variable p which is a wave parameter that equals the ratio of $|\underline{k}|$ to $\omega$, where $\underline{k}$ is the wave vector and $\omega$ is the angular frequency of seismic waves in geological media having seismic wave velocity, v; and then, calculating the inverse Fourier transform of $E(\underline{k},z)$ to provide migrated data $E(x,z)$ that can be used to depict an image of a subsurface geological formation.

8. A process according to claim 7 wherein the extrapolated field is substantially as follows:

$$P(\omega,\underline{k};z) =$$

$$P(\omega,\underline{k};z=0) \begin{Bmatrix} B_N\left(\frac{\underline{k}}{\omega};z\right)e^{-i\omega\tau_n(\frac{\underline{k}}{\omega};z)} + \\ B_T\left(\frac{\underline{k}}{\omega};z\right)e^{+i\omega\tau_n(\frac{\underline{k}}{\omega};z)-2i\omega\tau^*(\frac{\underline{k}}{\omega})+i\frac{\pi}{2}} \end{Bmatrix}$$

with values for the amplitude functions $B_N$ and $B_T$ being determined as follows:

$$B_N(\underline{k},z,\omega) = \frac{2s^2(z)[s^2(0)-p^2]^{\frac{1}{2}}}{-i\omega\pi^2} \left|\frac{x_N\,dx_N}{p\,dp}\right|^{1/2}$$

$$B_T(\underline{k},z,\omega) = \frac{2s^2(z)[s^2(0)-p^2]^{\frac{1}{2}}}{-i\omega\pi^2} \left|\frac{x_T\,dx_T}{p\,dp}\right|^{1/2}$$

where the functions $\tau$ and $\tau^*$ represent phase delays defined by the ray parameter $p=|\underline{k}|/\omega$ at depths z and $z^*$, respectively, where $z^*$ is the turning point depth, and where the amplitudes of $B_N$ and $B_T$ depend on the ratio of $|\underline{k}|/\omega$.

9. A process according to claim 7 wherein the function $P(\omega,\underline{k};z)$ is extrapolated as follows:

$$P(\omega,\underline{k};z) =$$

$$P(\omega,\underline{k};z=0)\,B_M\left(\frac{|\underline{k}|}{\omega},z\right) \begin{Bmatrix} e^{-i\omega\tau_n(\frac{\underline{k}}{\omega},z)} + \\ e^{i\omega\tau_n(\frac{\underline{k}}{\omega},z)-2i\omega\tau^*(\frac{\underline{k}}{\omega})+\frac{i\pi}{2}} \end{Bmatrix}$$

where, $$B_M\left(\frac{\underline{k}}{\omega},z\right) = \left\{ \frac{\frac{1}{v^2(0)}-\frac{|k|^2}{4\omega^2}}{\frac{1}{v^2(z)}-\frac{|k|^2}{4\omega^2}} \right\}^{\frac{1}{4}}$$

and where values of the function $P(\omega,\underline{k};z=0)$ represent the magnitude of the Fourier transform of stacked seismograms.

10. A process for migrating seismic data relating to subsurface formations located in geological media which cause initially downwardly travelling seismic waves to turn upward, comprising the steps of:

transforming the Fourier transformed data $P(\omega,\underline{k},z)$ substantially as follows to the frequency domain:

$$e(\underline{k},z) = \int d\omega \, P(\omega,\underline{k};z)$$

where, $P(\omega,\underline{k};z) =$ $$P(\omega,\underline{k};z=0) \left\{ \begin{array}{l} B_N\left(\dfrac{\underline{k}}{\omega};z\right) e^{-i\omega\tau N(\tfrac{\underline{k}}{\omega};z)} + \\ B_T\left(\dfrac{\underline{k}}{\omega};z\right) e^{+i\omega\tau N(\tfrac{\underline{k}}{\omega};z)-2i\omega\tau^*(\tfrac{\underline{k}}{\omega})+i\tfrac{\pi}{2}} \end{array} \right\}$$

wherein the amplitude functions $B_N$ and $B_T$ are related to the amplitudes of the wavefield normal and turned components, respectively, and where the variable $\underline{k}$ is the seismic wave vector, z is depth in the geological medium, $\omega$ is the angular frequency of the wave traces, and the variable $\tau_N$ represents the phase delay of the normal wave and the variable $\tau^*$ represents the phase delay at the turning point of the wave;

migrating transformed data for turning and non-turning waves according to the following migration algorithm:

---

Initialize $E(\underline{k},z) = 0$.
For all wave vectors $\underline{k}$
  [
  For all frequencies $\omega$
    [
    Compute $p = |\underline{k}|/\omega$ to
    index tabulated phase-delays $\tau_n$ and
$\tau^*$ and amplitude functions
      for all depths z
        [
        $P(\omega,\underline{k};z)$ = extrapolation
    of $P(\omega,\underline{k};z=0)$, and
        $E(\underline{k},z) = E(\underline{k},z) +$
    $P(\omega,\underline{k};z)$
        ]
    ]
  ]

--- after values of the function $E(\underline{k},z)$ are calculated in accordance with the preceding algorithm, calculating its inverse Fourier transform for representing the migrated image, $E(x,z)$, of a subsurface formation located in geological media that causes seismic waves to turn.

11. A process according to claim 10 wherein the field $P(\omega,\underline{k};z)$ is extrapolated substantially as follows:

$P(\omega,\underline{k};z) =$ $$P(\omega,\underline{k};z=0) \left\{ \begin{array}{l} B_N\left(\dfrac{\underline{k}}{\omega};z\right) e^{-i\omega\tau(\tfrac{\underline{k}}{\omega};z)} + \\ B_T\left(\dfrac{\underline{k}}{\omega};z\right) e^{+i\omega\tau(\tfrac{\underline{k}}{\omega};z)-2i\omega\tau^*(\tfrac{\underline{k}}{\omega})+i\tfrac{\pi}{2}} \end{array} \right\}$$

with values for the amplitude functions $B_N$ and $B_T$ determined as follows:

$$B_N(\underline{k},z,\omega) = \frac{2s^2(z)\,[s^2(0)-p^2]^{\tfrac{1}{4}}}{-i\omega\pi^2} \left| \frac{x_N \, dx_N}{p \, dp} \right|^{1/2}$$

---

$$B_T(\underline{k},z,\omega) = \frac{2s^2(z)\,[s^2(0)-p^2]^{\tfrac{1}{4}}}{-i\omega\pi^2} \left| \frac{x_T \, dx_T}{p \, dp} \right|^{1/2}$$

where the functions $\tau$ and $\tau^*$ represent phase delays defined by the ray parameter $p=|\underline{k}|/\omega$ at depths z and $z^*$, respectively, where $z^*$ is the turning point depth, and where the amplitudes of $B_N$ and $B_T$ depend on the ratio of $|\underline{k}|/\omega$.

12. A process according to claim 10 wherein the field $P(\omega,\underline{k};z)$ is extrapolated substantially as follows:

$$P(\omega,\underline{k};z) = P(\omega,\underline{k};z=0)\,B_M\left(\frac{|\underline{k}|}{\omega},z\right)\{e^{-i\omega\tau N(\tfrac{\underline{k}}{\omega},z)} + e^{i\omega\tau N(\tfrac{\underline{k}}{\omega},z)-2i\omega\tau^*(\tfrac{\underline{k}}{\omega})+\tfrac{i\pi}{2}}\}$$

where, $$B_M\left(\frac{\underline{k}}{\omega},z\right) = \left\{ \frac{\dfrac{1}{v^2(0)} - \dfrac{|\underline{k}|^2}{4\omega^2}}{\dfrac{1}{v^2(z)} - \dfrac{|\underline{k}|^2}{4\omega^2}} \right\}^{\tfrac{1}{4}}$$

and where values of the function $P(\omega,\underline{k};z=0)$ represent the Fourier transform of CMP stacked seismograms.

13. A process for migrating seismic data relating to subsurface formations located in geological media which cause seismic waves to turn upward, comprising the steps of:

phase-shifting and scaling a Fourier-transformed zero-offset stacked time-section $P(\omega,\underline{k};z=0)$ according to functions that depend only upon the ratio of $|\underline{k}|$ to $\omega$ at each depth z, where $|\underline{k}|$ is the wave vector and $\omega$ is the angular frequency of seismic waves in a medium wherein seismic wave velocity, v, increases with depth;

tabulating values for the functions for a number of values of the ratio of $|\underline{k}|$ to $\omega$, and storing the tabulated values in the memory of a general purpose digital computer;

operating the computer to execute the following algorithm:

---

Initialize $E(\underline{k},z) = 0$.
For all wave vectors $\underline{k}$
  [
  For all frequencies $\omega$
    [
    Compute $p = |\underline{k}|/\omega$ to
    index tabulated phase-delays $\tau_n$ and
$\tau^*$ and an amplitude function $B_M$
      for all depths z
        [
        $P(\omega,\underline{k};z)$ = extrapolation
    $P(\omega,\underline{k};z=0)$, and
        $E(\underline{k},z) = E(\underline{k},z) +$
    $P(\omega,\underline{k};z)$
        ]
    ]
  ]

--- where the function $P(\omega,\underline{k};z)$ represents a wavefield which is extrapolated substantially as follows:

$$P(\omega,\underline{k};z) =$$

$$P(\omega,\underline{k};z=0)\, B_M\left(\frac{|\underline{k}|}{\omega},z\right)\left\{ \begin{array}{l} e^{-i\omega\tau_N(\frac{\underline{k}}{\omega},z)} + \\ e^{i\omega\tau_N(\frac{\underline{k}}{\omega},z)-2i\omega\tau^*(\frac{\underline{k}}{\omega})+\frac{i\pi}{2}} \end{array} \right\}$$

where:

$$B_M\left(\frac{\underline{k}}{\omega},z\right) = \left\{ \frac{\frac{1}{v^2(0)} - \frac{|\underline{k}|^2}{4\omega^2}}{\frac{1}{v^2(z)} - \frac{|\underline{k}|^2}{4\omega^2}} \right\}^{\frac{1}{4}}$$

where values of the function $P(\omega,\underline{k};z=0)$ represent the Fourier transform of common midpoint stacked seismograms;

where $\tau_n$ is a phase delay function that depends upon values of wave parameter, p, and the depth of travel, z, of waves in the geological media under consideration;

where $\tau^*(p)$ is a phase delay function that depends upon values of the variable p which is a wave parameter that equals the ratio of $|\underline{k}|$ to $\omega$, where $\underline{k}$ is the wave vector and $\omega$ is the angular frequency of seismic waves in geological media having seismic wave velocity, v; and then, calculating the inverse Fourier transform of $E(\underline{k},z)$ to provide migrated data $E(x,z)$ that can be used to depict an image of a subsurface geological formation.

* * * * *